Jan. 28, 1958　　　J. C. BAKER　　　2,821,681
RESISTANCE METERS
Filed May 26, 1955
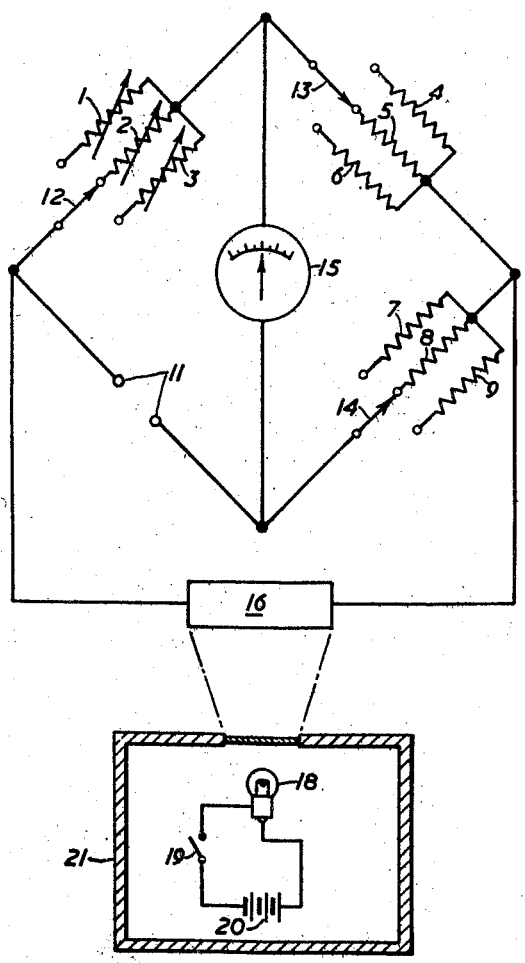
INVENTOR
JOHN C. BAKER
BY Watson, Cole, Grindle & Watson
ATTORNEYS

United States Patent Office 2,821,681
Patented Jan. 28, 1958

2,821,681

RESISTANCE METERS

John Charles Baker, Hayes, England, assignor to The Fairey Aviation Company Limited, Hayes, England, a British company Application May 26, 1955, Serial No. 511,307

Claims priority, application Great Britain May 27, 1954

2 Claims. (Cl. 324—62)

This invention relates to instruments for measuring the resistance of electrical conductors, and has for one object to provide an instrument for measuring the resistance of a conductor without any danger of passing too great a current through it or applying too great a voltage across it.

Some explosive elements, for example igniters and explosive caps, should not have too great a current (say above .25 amp.) passed through them or too great a voltage (say 1.5 volts) applied across them if they are not to explode, and the batteries or hand-driven dynamos incorporated in the usual well-known ohmmeters are capable of providing voltages and currents above these values.

According to the present invention in a resistance meter the source of voltage is a photo voltaic cell. The cell may for example be a selenium cell, a cuprous oxide cell, or a lead sulphide cell.

In one arrangement the resistance meter comprises a Wheatstone bridge.

Normally the cell is illuminated by natural light or by such artificial light as may be present in the place where the apparatus is used, to cause it to generate a voltage. However in certain circumstances, for example during war time under black-out conditions, illumination may be provided by a torch bulb or bulbs connected in circuit with a battery. It will be realized that this battery is not electrically connected to the circuit containing the conductor whose resistance is to be measured, so that it cannot cause it to explode. In this arrangement the circuit of the resistance meter and the source of illumination can conveniently be assembled in a single case from which lead two probes connected to the terminals, so that they can be connected across a conductor to be tested.

Of course where the conductor whose resistance is to be measured is not explosive a source of artificial light could be used with safety.

The illumination may be fluctuating, for example from a fluorescent lamp, in which case the bridge can be balanced with the aid of phones in the manner of a standard A. C. bridge.

A photo voltaic cell can only generate a limited voltage and only a limited current can be extracted from it. For example a selenium cell cannot generate a voltage greater than about 0.3 volt, and a cell of the size contemplated in the present invention cannot produce more than about 0.002 amp., and neither is sufficient to cause the explosion of an igniter or explosive cap as described above.

The invention may be carried into practice in different ways but one specific embodiment will be described by way of example with reference to the accompanying drawing, the single figure of which is a combined circuit diagram and sketch of a resistance meter embodying the invention.

The resistance meter includes a Wheatstone bridge network having four arms, the first of which contains three variable resistors, 1, 2, 3, with ranges respectively of 0 to 10 ohms, 0 to 100 ohms and 0 to 1,000 ohms, the second of which contains three fixed resistors, 4, 5, and 6, with values respectively of 5 ohms, 50 ohms and 500 ohms, the third of which contains three fixed resistors, 7, 8 and 9, with values respectively of 5 ohms, 50 ohms and 500 ohms, and the last of which contains a pair of terminals 11. The first three arms each include one of the three poles 12, 13, 14, of a three-pole three-way switch with a constant low contact resistance, which is arranged so that in one position the resistors 1, 4 and 7 are connected in their respective arms, in the next position (as shown) resistors 2, 5 and 8 only are connected and in the third position resistors 3, 6 and 9 only are connected.

The three-pole switch enables the meter to have three ranges of 0 to 10 ohms, 0 to 100 ohms and 0 to 1,000 ohms respectively so that resistors of different values can be measured equally accurately.

Across one diagonal of the bridge, in parallel with the two arms containing the fixed resistors 4, 5, 6, 7, 8 and 9, is connected a centre-zero galvanometer 15 for determining when the bridge is balanced. A suitable galvanometer is the Sangamo Weston Limited Model S. 20 (111) with a scale 2.1" long with 30 divisions on either side, a sensitivity of 1.3 micro-amps. per division at zero, and a resistance of 75 ohms.

Across the other diagonal is connected a selenium barrier cell 16 which, according to one arrangement, is arranged to be illuminated by daylight or artificial light as desired. The apparatus is mounted in an airtight case (not shown) with the galvanometer dial visible and with two probes connected to the terminals 11 leading from the case for making contact with a conductor whose resistance is to be measured.

In another arrangement, when conditions demand an incorporated light source for illuminating the cell, there are also provided a lamp 18 connected through a switch 19 with a battery 20, all mounted in a case 21 which is contained within the main airtight case.

When it is desired to measure the resistance of a conductor, for example an explosive cap, the two probes are connected across the cap terminals so that it is connected in the fourth arm of the bridge. The appropriate light source excites the selenium cell which generates a voltage across the bridge. The variable resistors 1, 2 or 3 is adjusted in the usual way to give null reading of the galvanometer 14 indicating that the bridge is balanced.

The selenium cell 16 is not capable of generating a voltage greater than about 0.3 volt nor of delivering a current greater than about 2 milli-amps. so that even if faults develop in the meter and what ever such faults may be, the conductor connected across the terminal can never have greater voltage than this connected across it or a greater current than this passing through it.

In an alternative arrangement the selenium cell is illuminated by a fluorescent light energized from an A. C. source so that the input to the bridge will be alternating and so that it can be balanced with the aid of phones in the manner of a standard A. C. bridge.

A short circuit connection including a push-button switch may be connected across the galvanometer to damp the movement of the delicate mechanism and prevent damage during transit of the meter.

What I claim as my invention and desire to secure by Letters Patent is:

1. A resistance meter for measuring the resistance of an explosive conductor comprising a four arm resistance bridge of which the resistance of one arm is to be constituted by the explosive conductor whose resistance is to be measured, a photo-voltaic cell connected across one diagonal of the bridge and an indicating galvanometer connected across the other diagonal, a lamp positioned to illuminate the cell and a battery connected to illuminate said lamp.

2. A resistance meter as claimed in claim 1 including an explosive conductor whose resistance is to be measured connected in one arm of the bridge.

References Cited in the file of this patent

UNITED STATES PATENTS

| | | |
|---|---|---|
| 1,820,214 | Borden | Aug. 25, 1931 |
| 2,038,277 | Gent | Apr. 21, 1936 |
| 2,471,001 | Miller | May 24, 1949 |
| 2,492,459 | Bondurant | Dec. 27, 1949 |

FOREIGN PATENTS

| | | |
|---|---|---|
| 921,937 | France | May 22, 1947 |